Figure 1:
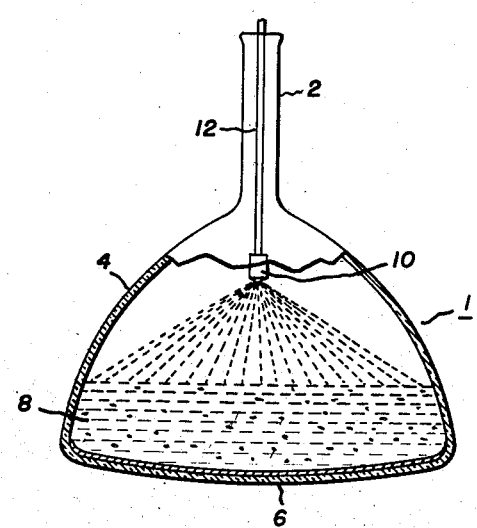

Nov. 24, 1959

J. TOGIAS 2,914,420

METHOD OF MAKING A LUMINESCENT SCREEN

Filed Sept. 16, 1957

INVENTOR:
JAMES TOGIAS,
BY
HIS ATTORNEY.

United States Patent Office 2,914,420
Patented Nov. 24, 1959

2,914,420

METHOD OF MAKING A LUMINESCENT SCREEN

James Togias, Baldwinsville, N.Y., assignor to General Electric Company, a corporation of New York Application September 16, 1957, Serial No. 684,005

2 Claims. (Cl. 117—33.5)

This invention relates to improvements in the making of luminescent screens for cathode ray tubes and the like by liquid settling.

One know liquid settling process of making a phosphor screen involves covering a substrate on which the screen is to be formed with a layer of cushioning liquid, mixing with the cushioning liquid a water suspension of phosphor particles together with a water solution of a suitable binder, and allowing the phosphor and binder to settle onto the substrate. Preferably the binder is one of the water soluble silicates such as potassium silicate, and the cushioning liquid is of an electrolytic type, consisting for example of a water solution of an ionizable salt. Optionally some of the binder may be mixed with the cushioning liquid before introduction of the phosphor. But generally all of the binder is mixed with the phosphor suspension before introduction into the cushioning liquid, and the phosphor-binder mixture is thereafter so introduced into the cushioning liquid, as by spraying it onto the surface of the cushioning liquid, as to provide optimum evenness of distribution of the phosphor over the surface of the substrate. After the phosphor and binder settles through the cushioning liquid into place on the substrate and the binder sets up or gells sufficiently to hold the phosphor in place, the supernatant liquid is removed as by decanting and the phosphor layer is dried.

If the screen is to be metallized it is often necessary before application of the resin film which precedes the metallizing step to bake the screen for a prolonged period, for example one hour at 400° C., after which of course the screen and substrate must be cooled to a safe temperature before the film is applied. The reason for this pre-film baking is that the adhesive strength of the freshly settled phosphor layer is often not sufficient to withstand the processing involved in applying the film. If the film is applied by spraying, the usual preliminary wetting of the screen with water or the blast of the film spray may dislodge some of the phosphor, and if the film is applied by flotation the introduction of the water cushion onto which the resin is cast or the shrinkage of the film as it dries in place may pull fragments of the phosphor loose. Consequently, without preliminary baking to increase its strength, the film application may destroy or sufficiently damage the screen as to make it unacceptable.

Various attempts have been made before my invention to increase the adhesion of the phosphor particles of the dried screen to one another and to the substrate so as to enable the screen to withstand better the handling and processing steps subsequent to initial settling and drying, but so far as I am aware none of these prior attempts have been particularly successful.

Accordingly one object of the present invention is to provide an improved method of liquid settling luminescent screens for cathode ray tubes and the like which results in a screen having an increased dry adhesion between the individual particles of luminescent material of the screen and between the luminescent material and the substrate on which it is formed.

Another object is to provide an improved method of increasing the dry adhesion of liquid settled phosphor screens which is simple and easy to perform, which is economical of material, and which involves minimum hazard to the screen.

Another object is to provide an improved method of increasing the dry adhesion of liquid settled phosphor screens which substantially reduces the overall time required for screening and filming.

These and other objects of the invention will be apparent from the following description and the accompanying drawing.

Briefly, according to the present invention, I have discovered that the dry adhesion of a liquid settled phosphor screen can be substantially increased, to a degree at least sufficient to enable elimination of the pre-film baking and cooling steps heretofore required, by adding to the cushioning liquid after the phosphor has settled and just before removal of supernatant liquid, a very small quantity of concentrated acetic acid. While the optimum quantity of acid will vary with its concentration and with the size of the screen, I have found that, using glacial acetic acid having a substantially 100% concentration, a few drops is a sufficient quantity for most screens. Two or three drops of glacial acetic acid, for example, is sufficient for a cathode ray tube screen of 10" diameter.

Figure 2:
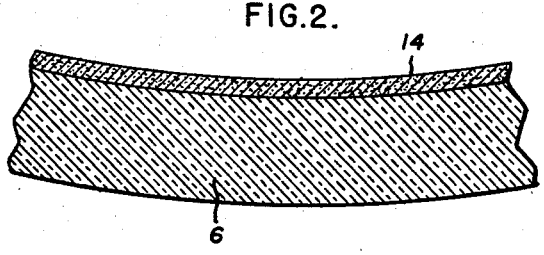

In the drawing:

Fig. 1 is a view, partly broken away in vertical section, of a cathode ray tube envelope arranged for screening according to the present invention; and Fig. 2 is a fragmentary enlarged sectional view of a portion of the faceplate of Fig. 1 at an intermediate stage in the screening process.

Referring to Fig. 1 there is shown a cathode ray tube envelope 1 including a neck 2, cone 4 and faceplate 6 providing a substrate on which a phosphor screen is to be formed. In liquid settling a screen onto the faceplate 6 according to one known process, the envelope 1 is arranged with the neck 2 upright and there is introduced into the envelope a charge of cushioning liquid 8 sufficient to cover the faceplate to a desired depth, such as a few inches. The cushioning liquid may be water but preferably it is an electrolytic solution such as a water solution of an ionizable salt, for example barium acetate. A charge of any suitable cathodoluminescent powdered phosphor suspended in water, mixed with a binder in the form of a water solution of a water soluble silicate such as potassium silicate, is next introduced into the cushioning liquid as by spraying onto the surface of the cushioning liquid from a spray tip 10 at the end of a tube 12 inserted into the neck of the envelope. Alternatively the binder may be introduced into the cushioning liquid separate from the phosphor, or the phosphor and binder may be poured into the cushioning liquid, and the resulting mixture thoroughly agitated before settling is allowed to take place. The phosphor and binder are then allowed to settle through the cushioning liquid to form a layer of the desired thickness on the substrate. After settling has taken place it is customary to remove the supernatant liquid as by decanting or siphoning, leaving the settled phosphor layer 14 in place on the substrate 6 as shown in Fig. 2. The present invention is not limited to any particular phosphor, and the phosphor may accordingly be any luminescent phosphor otherwise suitable for use as a screen for a cathode ray tube or the like, such as a phosphor conventionally known as P–4 type and comprising silver activated zinc sulfide-zinc cadmium sulfide.

Figure 3:
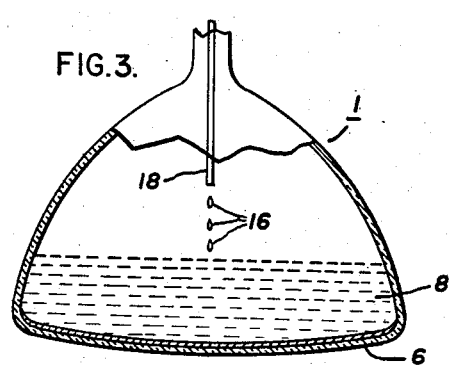

According to the present invention I add to the cushioning liquid 8 a short time before removal thereof from envelope 1 a slight quantity of supplementary binder in the form of concentrated liquid acetic acid. Although a lesser concentration may be used if desired, it is preferred to use acid of maximum concentration, such as glacial acetic acid having a concentration of approximately 100%, or at least a concentration such as to have a density greater than that of the cushioning liquid so as to promote rapid settling through the cushioning liquid. When glacial acetic acid is used a few drops of acid is enough to produce a substantially increased dry screen adhesion, two or three drops for example being sufficient for a ten inch diameter screen. As shown in Fig. 3 the acid 16 may be introduced into the envelope 1 through a dropper or pipette 18, or in any other desired manner.

The detailed mechanics of the process by which this slight quantity of acid increases the dry adhesion of the phosphor particles to one another and to the substrate are not fully understood. However, it appears that the acid settles onto the previously settled phosphor and binder layer sufficiently rapidly as to remain substantially undiluted by the cushioning liquid. Once having settled, the acid is believed to react chemically with the hydrous silicate to produce silicic acid and potassium acetate. Thereupon, it is believed that removal of water of hydration as the screen is dried converts the silicic acid to silicon dioxide, producing a hard water-insoluble quartz-like matrix about the phosphor particles, which matrix has a high strength and thereby firmly secures the phosphor particles to one another and to the substrate.

Whether the above-described reaction is in fact what happens I do not know, but in any event I have found that the slight quantity of acid added in the manner above-described does produce a marked increase in the dry adhesive strength of the phosphor layer. The increase in dry adhesion is sufficient to enable complete elimination of the pre-film baking step, and the attendant prolonged cooling step, heretofore required to avoid destruction of the phosphor layer during the process of applying the resin film. Since the pre-film baking step heretofore required took approximately one hour, and the subsequent cooling of the envelope to a safe temperature required approximately another hour, it will be appreciated that according to the present invention the time required for processing an individual screen may be reduced by approximately two hours.

The present invention also has other advantages. It will be apparent that the screen strengthening method herein described is extremely economical of materials since only a slight quantity of acetic acid is required, and the addition of the acid is a step which is quite simple and easy to perform requiring no special training or skill, and is hence readily adaptable to production screening.

It will be appreciated by those skilled in the art that the invention may be carried out in various ways and may take various forms and embodiments other than those illustrative embodiments heretofore described. It is to be understood therefore that the scope of the invention is not limited by the details of the foregoing description, but will be defined in the following claims.

What I claim as new and desire to secure by Letters Patent of the United States is:

1. In a process of making a luminescent screen for a cathode ray tube or the like which includes the steps of covering a substrate with a layer of cushioning liquid consisting essentially of an aqueous solution containing particles of luminescent material and from .005 to 0.5 percent by weight of an ionizable salt and a silicate binder for securing said particles together, allowing the luminescent material and binder to settle through the cushioning liquid onto the substrate to form a layer of desired thickness, removing the cushioning liquid, and drying the layer of luminescent material in place on the substrate, the method of increasing the dry adhesion of the luminescent material particles to each other and to the substrate which comprises dispensing into the cushioning liquid from ½ to 5 minutes before said removal of the cushioning liquid a quantity consisting of from 2 to 20 drops of supplementary binder consisting of substantially 100 percent concentration glacial acetic acid having a density greater than said cushioning liquid, and allowing the supplementary binder to settle through the cushioning liquid onto the layer of settled luminescent material.

2. The method of making a luminescent screen for a cathode ray tube or the like comprising the steps of covering a substrate with a layer of cushioning liquid consisting essentially of an aqueous solution containing particles of luminescent material and from .005 to 0.5 percent by weight of an ionizable salt from the group consisting of barium and strontium and a silicate binder for securing said particles together, allowing the luminescent material and binder to settle through the cushioning liquid onto the substrate to form a layer of desired thickness, dispensing into the cushioning liquid from ½ to 10 minutes before said removal of the cushioning liquid a quantity consisting of from 2 to 20 drops of substantially 100 percent concentration glacial acetic acid having a density greater than said cushioning liquid, allowing the acetic acid to settle through the cushioning liquid onto the layer of settled luminescent material, removing the cushioning liquid, and drying the layer of luminescent material in place on the substrate.

References Cited in the file of this patent

UNITED STATES PATENTS 2,678,888     Evans     May 18, 1954
2,840,488     Watson     June 24, 1958